United States Patent
Akins, III et al.

(10) Patent No.: US 9,363,209 B1
(45) Date of Patent: Jun. 7, 2016

(54) APPARATUS, SYSTEM, AND METHOD FOR RESEQUENCING PACKETS

(71) Applicants: CISCO TECHNOLOGY, INC., San Jose, CA (US); STMicroelectronics, Inc., Coppell, TX (US)

(72) Inventors: Glendon Leo Akins, III, Fort Collins, CO (US); Gale L. Shallow, Johns Creek, GA (US); Charaf Hanna, Lewisville, TX (US); Andrew Graham Whitlow, Lewisville, TX (US); Zhifang Ni, Plano, TX (US); Benjamin Nelson Darby, Huntsville, AL (US); Maynard Darvel Hammond, Lawrenceville, GA (US)

(73) Assignees: CISCO TECHNOLOGY, INC., San Jose, CA (US), part interest; STMICROELECTRONICS, INC., Coppell, TX (US), part interest ( * ) Notice: Subject to any disclaimer, the term of this patent is extended or adjusted under 35 U.S.C. 154(b) by 225 days.

(21) Appl. No.: 14/020,625

(22) Filed: Sep. 6, 2013

(51) Int. Cl.
*H04L 12/28* (2006.01)
*H04L 12/939* (2013.01)

(52) U.S. Cl.
CPC .................................. *H04L 49/552* (2013.01)

(58) Field of Classification Search
None
See application file for complete search history.

(56) References Cited

U.S. PATENT DOCUMENTS

| | | | | |
|---|---|---|---|---|
| 7,512,129 B1* | 3/2009 | Favor et al. | ................... | 370/394 |
| 7,826,457 B2* | 11/2010 | Bennett | ................ | H04L 1/1841 370/394 |
| 7,990,861 B1* | 8/2011 | Jin et al. | ........................ | 370/231 |
| 2004/0042483 A1* | 3/2004 | Elzur | ..................... | H04L 29/06 370/463 |
| 2004/0213151 A1* | 10/2004 | Willhite | .............. | H04L 12/5601 370/229 |
| 2005/0021558 A1* | 1/2005 | Beverly et al. | ............. | 707/104.1 |
| 2005/0100048 A1* | 5/2005 | Chun et al. | .................... | 370/468 |
| 2005/0245276 A1* | 11/2005 | Torsner | ......................... | 455/502 |
| 2005/0265394 A1* | 12/2005 | Chapman et al. | ............. | 370/480 |
| 2005/0286527 A1* | 12/2005 | Tieu | ...................... | H04L 69/163 370/394 |
| 2008/0130681 A1* | 6/2008 | Hong et al. | ................... | 370/468 |
| 2008/0225765 A1* | 9/2008 | Marinier et al. | .............. | 370/310 |
| 2010/0274921 A1* | 10/2010 | Lerzer | ................... | H04W 80/02 709/234 |
| 2011/0116443 A1* | 5/2011 | Yu et al. | ........................ | 370/328 |
| 2012/0300648 A1* | 11/2012 | Yang | ........................... | 370/252 |
| 2013/0070777 A1* | 3/2013 | Hutchison | ............... | H04L 43/50 370/412 |
| 2013/0114606 A1* | 5/2013 | Schrum et al. | ........... | 370/395.53 |

* cited by examiner

*Primary Examiner* — Otis L Thompson, Jr.
(74) *Attorney, Agent, or Firm* — Patent Capital Group

(57) ABSTRACT

A method is provided in one example and includes receiving a plurality of packets; identifying whether a particular packet, of the plurality of packets, is part of a sequenced flow; identifying whether a particular sequence number of the particular packet is being received within a time window; identifying whether the particular packet was a next expected packet for a particular flow; and forwarding the particular packet to a next destination. In more particular embodiments, packet inspection is used to set one or more flags for identifying characteristics associated with the plurality of packets. Certain packets in non-sequenced flows are routed directly from an input interface to an output interface of a resequencer module using a flow-through packet path.

20 Claims, 5 Drawing Sheets

APPARATUS, SYSTEM, AND METHOD FOR RESEQUENCING PACKETS

TECHNICAL FIELD

This disclosure relates in general to the field of communications and, more particularly, to an apparatus, a system, and a method for resequencing packets.

BACKGROUND

Data Over Cable Service Interface Specification (DOCSIS) is an international telecommunications standard that permits the addition of high-speed data transfer to an existing cable TV (CATV) system. DOCSIS can be employed by cable television operators to provide Internet access over their existing hybrid fiber-coaxial (HFC) infrastructure. DOCSIS can provide a variety in options available at Open Systems Interconnection (OSI) layers 1 and 2, the physical, and data link layers. As with any system that serves consumers, optimizing speed, latency, processing time, synchronization, etc. presents a significant challenge to system designers, network architects, and engineers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes receiving a plurality of packets; identifying whether a particular packet, of the plurality of packets, is part of a sequenced flow; identifying whether a particular sequence number of the particular packet is being received within a time window; identifying whether the particular packet was a next expected packet; and forwarding the particular packet to a next destination. In more particular embodiments, a packet inspection module is used to set one or more flags for identifying characteristics associated with the plurality of packets. Certain packets in non-sequenced flows are routed directly from an input interface to an output interface of a resequencer module using a flow-through packet path. In more particular embodiments, the flow-through packet path includes at least one buffer. If the plurality of packets are not part of a sequenced flow, the plurality of packets bypass a resequencing function and are forwarded to a next processing stage.

In certain examples, a resequencing context is configured for each flow that is being resequenced. The context is managed using structures resident in on-chip memory, while packets that are part of the resequenced flow and that have been received out of order are stored in a lower cost off-chip memory element. In more particular embodiments, the off-chip memory element can be a double data rate (DDR) memory element in a specific implementation, but the present disclosure is not so limited to such a DDR configuration.

Certain packets that are forwarded to a resequencing module are managed and stored until a time at which they can be forwarded to a next processing stage. In at least one embodiment, in-order packets corresponding to a first group of flows is stored on-chip as part of a single integrated circuit, and out-of-order packets corresponding to a second group of flows is stored off-chip and not part of the single integrated circuit. If the particular sequence number of the particular packet is not within the time window, the particular packet is dropped. If the particular packet was not in order (or if the packet's sequencing information indicates this is not the next expected packet for the context it belongs to), the particular packet is forwarded to a memory.

Example Embodiments

Figure 1:
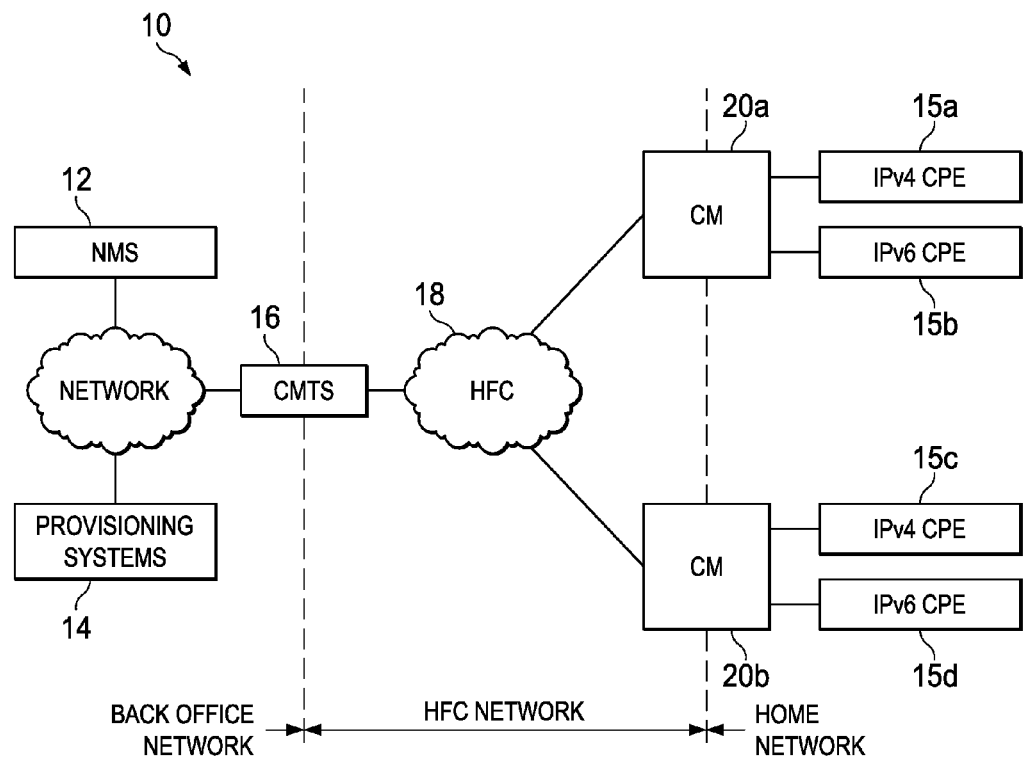
FIG. 1 is a simplified block diagram of a communication system associated with a hybrid fiber-coaxial (HFC) infrastructure in accordance with one embodiment of the present disclosure.

Turning to FIG. 1, FIG. 1 is a simplified block diagram of a communication system 10 associated with a hybrid fiber-coaxial (HFC) infrastructure in accordance with one embodiment of the present disclosure. FIG. 1 includes a network management system (NMS) 12, a plurality of provisioning systems 14, and a cable modem termination system (CMTS) 16, all of which may be suitably coupled to any type of network (e.g., an Internet, an Intranet, a wireless network, local area network (LAN), etc.). Also provided in FIG. 1 is a hybrid-fiber/coax (HFC) network 18, which is coupled to multiple cable modems (CMs) 20a-20b. Each CM can be coupled to various instances of customer premise equipment (CPE) 15a-15d, which may be associated with Internet Protocol (IP) version 4 (IPv4) or version 6 (IPv6).

In one implementation, the CM connects to the operator's cable network and to a home network, bridging packets between them. Many CPE devices can connect to the CM's LAN interfaces. CPE devices can be embedded with the CM in a single device, or they can be separate, standalone devices. CPE devices may use IPv4, IPv6, or both forms of IP addressing. Examples of typical CPE devices include home routers, set-top devices, personal computers, etc. The CMTS connects the operator's back office and core network with the cable network. Its main function is to forward packets between these two domains, and between upstream and downstream channels on the cable network.

Various applications are used in the back office to provide configuration and other support to the devices on the DOCSIS™ network. These applications use IPv4 and/or IPv6, as appropriate to the particular operator's deployment. The applications include provisioning systems such as:

1) The Dynamic Host Configuration Protocol (DHCP) servers provide the CM with initial configuration information, including IP address(es), when the CM boots.

2) The Config File server is used to download configuration files to CMs when they boot. Configuration files are in binary format and permit the configuration of the CM's parameters.
3) The Software Download server is used to download software upgrades to the CM.
4) The Time Protocol server provides Time Protocol clients, typically CMs, with the current time of day.
5) Certificate Revocation server provides certificate status.

With respect to the NMS, a Simple Network Management Protocol (SNMP) Manager allows the operator to configure and monitor SNMP agents (typically, the CM and the CMTS). A Syslog server collects messages pertaining to the operation of devices.

Figure 2:
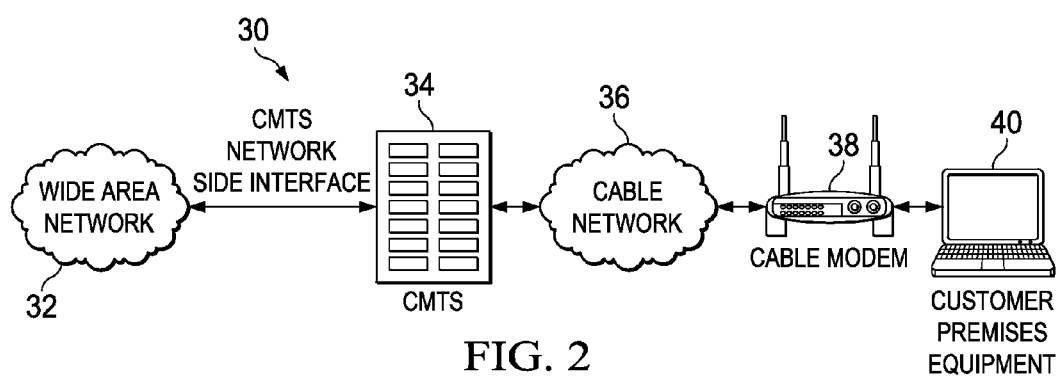
FIG. 2 is a simplified block diagram of a communication system associated with traffic propagating through a data-over-cable system in accordance with one embodiment of the present disclosure.

FIG. 2 is a simplified block diagram of an example communication system 30 associated with traffic propagating through the data-over-cable system in accordance with one embodiment of the present disclosure. FIG. 2 includes a wide area network (WAN) 32, a CMTS 34, a cable network 36, a cable modem 38, and a CPE 40. The DOCSIS system allows transparent bi-directional transfer of IP traffic, between the cable system head-end and customer locations, over an all-coaxial or hybrid-fiber/coax (HFC) cable network.

For purposes of illustrating certain example techniques of communication system 10, it is important to understand the communications that may be traversing the network. The following foundational information may be viewed as a basis from which the present disclosure may be properly explained. DOCSIS3.0™ introduced the concept of sending packets from one flow over more than one downstream channel. This is referred to as 'downstream channel bonding' in the DOCSIS3.0 Cable Labs Specification™. Incoming data from the downstream channels may be part of a bonded flow. Packets from bonded flows may be received out of order across multiple channels due to variations in the physical media, channel modulation type, and CMTS (e.g., DOCSIS3.0 head-end equipment) latency issues. The DOCSIS3.0 cable modem (CM) or embedded cable modem (eCM) can be responsible for detecting packet loss and for putting the packets back in the proper order before forwarding to the appropriate packet interface. Packet order is indicated by the packet sequence numbers that the CMTS inserts into the DOCSIS packet header attached to these packets. This process is called packet resequencing.

The number of channels that may be bonded together in DOCSIS3.0™ can vary from two to some number specified by the implementer (no maximum number of channels is specified in the CableLabs Specification). As more channels are added, the packet throughput rate increases and makes it impossible for software (microprocessor) based solutions to manage the resequencing function without causing a decrease in packet throughput performance.

Figure 3:
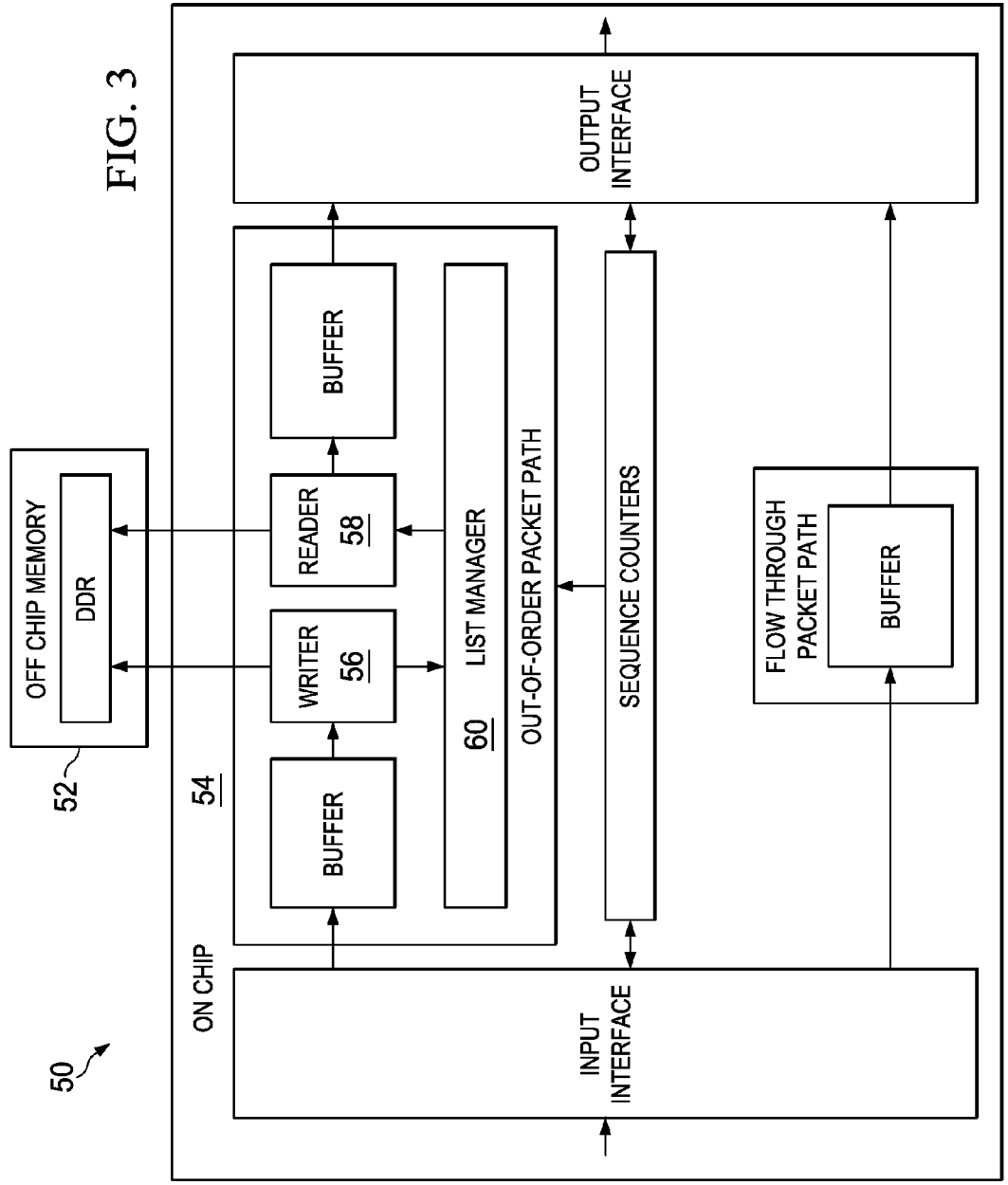
FIG. 3 is a simplified block diagram of a resequencer module in accordance with one embodiment of the present disclosure.

Turning to FIG. 3, FIG. 3 is a simplified block diagram of a resequencer module 50 being provisioned within a cable modem in accordance with one example implementation. Alternatively, resequencer module 50 can be provisioned within a CMTS, or in any other appropriate location. The architecture of FIG. 3 can resolve one or more of the aforementioned problems discussed above. In particular, the resequencer module 50 of FIG. 3 can offer a hardware based solution, which solves the problems discussed above, while also balancing the final cost of the product by judicious use of on-chip silicon area and external off-chip memory (e.g., double data rate (DDR) memory) to implement the needed buffering to manage the packet resequencing function. Note that the term "on-chip" is denoting or relating to circuitry included in a single integrated circuit or in the same integrated circuit as a given device.

Further, example embodiments of the architecture discussed herein is fully configurable to support any desired number of downstream channels (from 1 to 32) and can be extended to above 32 if appropriate. The solution can eliminate the packet throughput loss, as the number of downstream channels is increased, as well as solve the problem that arises due to the fact that no maximum number of channels is specified in the DOCSIS3.0 Specification.

Resequencer module 50 can include an off-chip memory 52 and an on-chip portion 54 in one example implementation. It may also include a writer 56, a reader 58, and a list manager 60. Additionally, the architecture may include any suitable number of buffers, input interfaces, output interfaces, and sequence counters. A hardware implementation of a packet resequencer can be provided to achieve the maximum packet throughput, where no per-packet intervention by a host processor is required. The architecture can effectively minimize the impact of packet resequencing on downstream throughput and silicon cost. It can also provide minimized on-chip storage for supporting 32 resequencing contexts (but could be extended to any number of contexts). It also provides configurability in use of the off-chip memory for packet storage, while undergoing reordering. This minimizes the need for costly on-chip packet buffering and, further, allows for flexibility in the amount of the off-chip memory used for this function, thereby reducing overall system costs when silicon is used in a product. It also provides output rate control features when the resequencer is used in a system with limited output rates. In addition, it decreases packet loss and enables flexibility for use in many different types of systems. Additionally, it provides a "flow-through" path that allows packets, which do not require resequencing, to bypass the resequencing function and be forwarded directly to the next processing stage.

Packets received by the resequencer can be inspected by the resequencing hardware engine to determine if they are part of a bonded flow and, if so, it determines if they are being received "out of order." Packets that are "out of order" can be forwarded to the resequencing hardware engine. Packets that are not part of the bonded flow, or that are received in order, are forwarded to the flow-through path. Some advantages provided by the use of the flow-through path under these circumstances are that it:

1) Minimizes the off-chip memory bandwidth usage if packets arrive in sequence.
2) Minimizes latency if packets arrive in sequence because they do not have to be sent to and retrieved from the off-chip memory.

Packets that are forwarded to the resequencing hardware engine should be managed and stored until the time arrives at which they can be forwarded to the next processing stage. Each bonded flow can create a resequencing context. Packets can be stored in the off-chip memory and certain information about the packet can be stored in on-chip buffers for the resequencing context to which the packet belongs. The information that is stored on-chip is utilized by the resequencing hardware engine to determine when a packet can be retrieved from the off-chip memory to be forwarded to the next packet processing stage. The resequencing hardware engine can allocate on-chip and off-chip memory utilization that allows for performing the required functions, while maintaining a low system cost and while also achieving the required throughput rates. Further, the system cost can be minimized by maintaining system flexibility through run-time configurable use of the off-chip memory.

For off-chip memory packet release processes, an approach was used such that, in instead of utilizing a single controller that would test for all the possible conditions that can cause a packet to be released from the off-chip memory, a control structure was used that makes use of individual scanners for each potential condition. The outputs of the packet scanners can be fed to an arbiter that makes the decision to release the best packet based on the known conditions and causes to release a packet.

In certain examples, the architecture may provide any number of advantages, including:
1) Scanners can be added or removed as specifications/reasons to release a packet are added or removed from the DOCSIS Specifications.
2) Each scanner can be tested by itself, which helps chip verification time.
3) Scanning logic is separated from the arbiter, allowing changes in priority to be adjusted independently of the scanners without retesting.

In certain example implementations, for the dual sequence number counters, the architecture uses dual sequence number counters to track received and freed packets. This enables dual flow-through/out-of-order packet path logic. The off-chip memory packet dispatch logic can queue up multiple packets in order from the off-chip memory without waiting on packets to be output the output interface. This allows packets to be fetched from the off-chip memory with less time between them, increases throughput, and allows for an optimized high-speed packet output rate for packets from the off-chip memory.

At least one embodiment of the present disclosure may use a DDR for the off-chip memory. It is imperative to note, and it should be understood that the DDR is only one of the many possible types of memory that could be used in conjunction with the present disclosure, which is not limited to a DDR implementation. Any number of additional memory types (e.g., serving as off-chip memory) can be used such as SRAM, synchronous SRAM, quad data rate SRAM, DRAM, high-speed serial interconnected DRAM, etc.

The architecture can provide a fully parameterized design such that the number of receive channels, number of flows, and the number of off-chip memory queues can be adjusted. This allows for rapid changes in the build of any corresponding ASIC, which allows chips to be verified, synthesized, and taped out faster. Additionally, the resequencing hardware engine allows for run time adjustment of the amount of the off-chip memory used as well as for run time adjustment of the number of active channels and resequencing contexts or flows.

Note that the design can reduce the size of the off-chip memory packet buffer used to hold out of order packets. A single ASIC can support a wide range of end user products. Hence, both lower cost products [with less off-chip memory and less functionality] and high cost/high performance products [with more off-chip memory and more functionality] can be based on the same ASIC, which spreads ASIC mask costs over a larger number of shipped products. In at least one example embodiment, the design uses both expensive on-chip memory and less-expensive off-chip memory to hold data about received packets. Information that needs to be accessed quickly [such as the linked list of packet pointers] can be stored on-chip. Bulky information [such as out-of-order packets] can be stored off-chip. Information such as in-order packets that can be held a short amount of time can be held on-chip.

The architecture can use less expensive memory (off-chip) to allow for a large packet resequencing buffer that is capable of meeting the specifications requirements. On-chip low-latency storage of packet descriptors and in-order packets allows for a high-performance resequencing engine. If packets arrive in order, they are not sent to the off-chip memory, which can decrease system latency and end-user packet ping times. This can increase the number of streams that can be supported by a single end-user product. Packet buffers from a single pool of the off-chip memory can be dynamically allocated to packets from flows with the highest number of out-of-order packets. This can allow a lowest overall product cost implementation for a given number of flows and channels. Packets can be stored in the off-chip memory in block-sized buffers, whose size is optimized for the varied sizes of packets received by a system. Short packets occupy single blocks, while larger packets are split into multiple blocks. In some cases, the blocks can be contiguous; in other cases, the blocks can be non-contiguous. A judicious choice of the buffer block-size insures that short packets do not waste the off-chip memory while still enabling long packets to be stored in the off-chip memory. Flexible efficient use of the off-chip memory results in overall lowered system cost.

Packet descriptors in memory (e.g., in SRAM or on-chip can be dynamically allocated to packets from flows with the highest number of out-of-order packets. Each packet dispatch state machine maintains a separate copy of the head of each linked list for the set of downstream receive channels that are included in the flow's resequencing context. This allows each packet dispatch state machine to operate independently of each other and, further, allows multiple packet dispatch state machines to dispatch packets simultaneously on different flows. This smooths and reduces latency required to access the single on-chip SRAM for all flows. It further allows for optimization of the amount of on-chip SRAM across all packet flows without incurring performance penalties.

In certain example embodiments, a hardware engine can automatically optimize on-chip SRAM usage to adapt to changing traffic flows/scenarios, requiring less on-chip SRAM and the flexibility to efficiently manage the unpredictable nature of the data traffic. Output rate control can be applied to combine the output of all flows. Output rate control can be applied to individual flows. Overruns in downstream modules can be prevented to the extent that the off-chip memory storage capacity allows. If a single flow is abruptly released from the off-chip memory, that flow's output can be slowed down at the resequencer's output interface to allow other flows time to output packets. Flexibility allows the resequencer module to be used in systems with varying output interface rate capabilities In operation of one example embodiment, and referring back to FIG. 3, the resequencer module detects packets received out of order in sequenced flows and then places those packets back into the correct order for subsequent processing by downstream modules (including the CPE). Packets in non-sequenced flows are routed directly from the input interface to the output interface using the flow-through packet path. The resequencer module tries to route packets from sequenced flows through the flow-through packet path as well. The sequence counters and the list manager can control the routing, expiration, and reordering of sequenced packet flows.

The flow-through path can include buffers used to buffer packets, while the output interface is concurrently outputting a packet from the out-of-order packet path. The out-of-order packet path contains its own input and output buffers to hold packets as they are written to the off-chip memory using the writer module or read from the off-chip memory using the reader module. The out-of-order packet path output buffer may be held off by the output interface until no more packets are available from the flow-through path. The list manager module within the out-of-order packet path manages the allocation of the off-chip memory and the flow of packets to and from the off-chip memory.

The writer interface can be a bus initiator. The writer allows a certain number of bus transfers to be outstanding at any particular time. The writer is used to write packets to the off-chip memory. The reader interface can be a bus initiator. The reader allows a certain number of bus transfers to be outstanding at any particular time. The reader is used to read packets from the off-chip memory.

The packet output interface receives packets from either the flow-through path or the out-of-order packet path and then outputs them to the downstream interfaces as necessary. The packet output interface operates similar to the packet input interface, but without the additional signals required to indicate if a packet is part of a sequenced flow or not.

The sequencer counter module tracks next sequence numbers and sequence change hold timers for the sequenced packet flows currently being processed by the resequencer module. The host processor can set the sequence change hold time, invalidate any or all sequence change flag values, and invalidate any or all next sequence number counters. The sequence counters module also tracks the next expected sequencer number for each of the sequenced downstream flows and whether each of these next expected sequence number values is valid or not. The next expected sequence number for a given downstream sequenced packet flow can be updated by either the input interface or the output interface.

The input interface updates the next expected sequence numbers using port one of the module. Updates occur when a packet is written to the flow-through packet path's input buffer. The output interface updates next expected sequence numbers using port two of the module. Updates occur when a packet is dispatched from the output of the off-chip memory packet path output buffer. Because a given flow can either be waiting on a packet from the off-chip memory or a packet from the input interface, but not both at once, updates to the same flow do not occur simultaneously.

The input interface determines whether to forward a packet immediately to the output interface, to forward a packet to the off-chip memory for later forwarding to the output interface, or to drop a packet altogether. For sequenced streams, this logic also depends on the current values of the sequence change and next expected sequence number information maintained by the sequence counter module.

Figure 4:
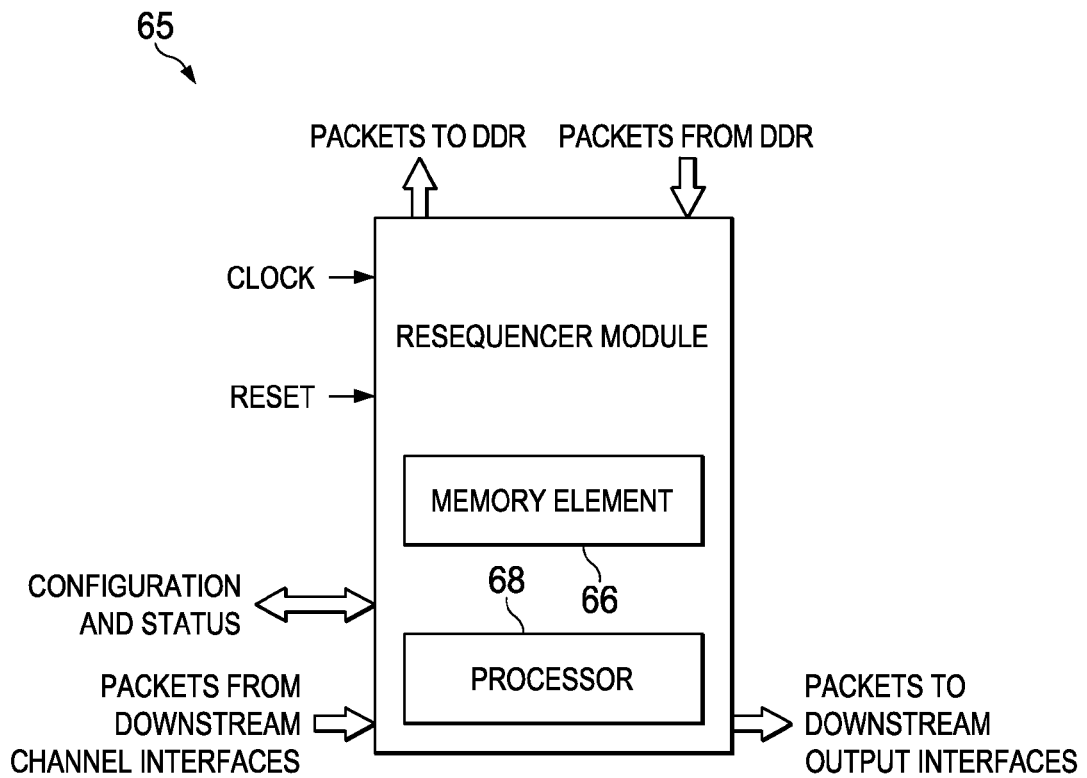
FIG. 4 is a simplified block diagram of interfaces associated with the resequencer module in accordance with one embodiment of the present disclosure.

FIG. 4 is a simplified block diagram illustrating several external interfaces of a resequencer module 65 in accordance with one embodiment of the present disclosure. Note that additional interfaces may be provided, or these interfaces of FIG. 4 may be removed or modified based on particular configuration needs. In general terms, resequencer module 65 may include a processor 66 and a memory element 68 for facilitating the activities discussed herein.

The downstream interface module asserts a ready signal to indicate that it has enough room to hold at least one more maximum length packet. In one implementation, packets from the flow-through interface are not held off and are forwarded to a downstream interface module regardless of the state of the ready signal. Note that this signal can be used to hold off resequenced packet flows that were routed through the off-chip memory. Once the ready signal is asserted, the packet output interface can output the next packet. This can server as part of the packet pacing mechanism used to achieve the flexibility for connecting to a variety of different end devices (potentially with different input bandwidth capacities). In another possible implementation, it would be possible to extend traffic shaping at the output of the resequencer to include packets from the flow through path.

Figure 5:
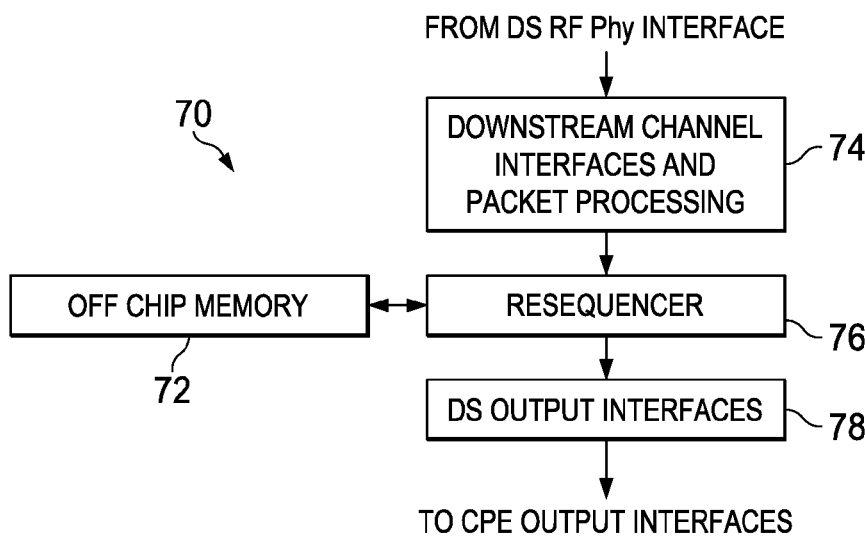
FIG. 5 is a simplified flow diagram associated with the resequencer module in accordance with one embodiment of the present disclosure.

FIG. 5 is a simplified block diagram illustrating one possible general configuration 70 associated with the present disclosure. FIG. 5 includes an off-chip memory 72, a downstream channel interfaces and packet processing element 74, a resequencer 76, and one or more downstream (DS) output interfaces 78 that may be linked to CPE output interfaces.

In operation, the resequencer detects packets received out of order in sequenced flows and places those packets back into the correct order for subsequent processing by downstream devices. Packets in non-sequenced flows are routed directly from the input interface to the output interface using the flow-through packet path. The resequencer tries to route packets from sequenced flows through the flow-through packet path as well.

The resequencer can contain a bus target that can be accessed by the host processor to configure and monitor the operation of the resequencer. The resequencer can track which RF channels are used by each downstream flow. In one example, the list of used RF channels is obtained from another module in the cable modem. In a second example, the list of used RF channels is provisioned by a processor using the bus target. The resequencer can track which downstream flows are paused. In one example, the list of paused RF channels is obtained from another module in the cable modem. In a second example, the list of paused RF channels is provisioned by a processor using the bus target.

The flow-through path can include several buffers. The first buffer is a packet data buffer. In one example, the packet data buffer is large enough to hold several maximum length IP packets. The second buffer is a packet descriptor buffer. The descriptor buffer holds information describing the packets in the packet data buffer. During operation, the input interface can periodically write packets to the packet data buffer. After the input interface has completely written a packet to the packet data buffer, the input interface writes a packet descriptor to the packet descriptor buffer describing the previously written packet. In a second example, the packet data and packet descriptors are stored in a single unified buffer.

When a packet descriptor is present in the flow-through path's packet descriptor buffer, the output interface can read that descriptor and then begin dispatching that packet to the next module in the downstream path (the downstream interface) by reading the number of data words indicated in the packet descriptor from the packet data buffer and outputting them on the resequencer's packet output.

If a packet is determined to be an out-of-order sequenced packet, the input interface writes the packet data to the out-of-order packet path's packet data buffer and the packet's control information to the out-of-order packet path's packet descriptor buffer. Once a packet's descriptor has been written to the out-of-order packet path's packet descriptor buffer, the packet writer can read the descriptor from the buffer, assign the packet a block number corresponding to an address in the off-chip memory, and begin writing the packet data from the out-of-order packet path's input packet data buffer to the off-chip memory using the writer interface. After the packet has been completely written to the off-chip memory, the packet writer writes the descriptor and block number for the packet to the individual flow's/channel's linked list. The linked list manager can include N individual linked lists, where N is the number of flows multiplied by the number of channels the system was built to handle. Each individual linked list contains packet descriptors for a single combination of downstream flow index and RF channel index. Stated in different terminology, a single linked list tracks all the packets for a given combination of flow and RF channel.

The linked list manager has three primary functions: adding packets to the tails of the linked lists, scanning the heads of the linked lists for packets to dispatch, and removing dispatched packets from the heads of the linked lists. When a packet descriptor is available, the linked list manager appends the descriptor to the tail of the linked list for the flow and RF channel indicated in the packet descriptor. Appending packets to linked lists is given priority over dispatching packets from linked lists. The linked list manager continuously scans the linked lists for flows with one or more RF channels in use. On each scanning pass, the linked list manager looks for packets that need to be dropped or dispatched. Each downstream flow can have its own scanning process in certain example embodiments of the present disclosure.

On a given downstream flow, packets can be dispatched if the sequence number of the packet at the head of the linked list matches the next expected sequence number (normal dispatch), or if all the in-use RF channels for a given flow have packets pending dispatch and none of those packets matches the next expected sequence number (early lost packet detection dispatch). Counters in the register module track the number of packets dispatched through both the normal packet dispatch and the early lost packet detection dispatch mechanisms. The dispatch of packets may be held off if either the packet reader is busy or the downstream interfaces are not ready to accept another packet.

Packets with expired time stamps or an outdated sequence change flag can be dropped. Counters in the register module track the number of packets dropped for each of these reasons. When a packet is dispatched, its packet descriptor is read from the head of its linked list and written to the packet reader. Once a packet has been dispatched or dropped, the linked list manager removes that packet from the head of its linked list.

Before discussing additional flows associated with the architecture of FIG. 1, a brief discussion is provided about some of the possible infrastructure that may be included in communication system 10. In one particular instance, communication system 10 can be associated with a service provider digital subscriber line (DSL) deployment. In other examples, communication system 10 would be equally applicable to other communication environments, such as a simple wide area network (WAN) deployment, cable scenarios, broadband generally, fixed wireless instances, and fiber to the x (FTTx), which is a generic term for any broadband network architecture that uses optical fiber in last-mile architectures. Communication system 10 may include a configuration capable of transmission control protocol/internet protocol (TCP/IP) communications for the transmission and/or reception of packets in a network. Communication system 10 may also operate in conjunction with a user datagram protocol/IP (UDP/IP) or any other suitable protocol, where appropriate and based on particular needs.

The networks discussed herein represent a series of points or nodes of interconnected communication paths for receiving and transmitting packets of information that propagate through communication system 10. The network offers a communicative interface between sources and/or hosts, and may be any LAN, wireless local area network (WLAN), metropolitan area network (MAN), Intranet, Extranet, WAN, virtual private network (VPN), or any other appropriate architecture or system that facilitates communications in a network environment using network elements.

CPEs 15a-15d can be associated with clients, customers, or end users wishing to initiate a communication in communication system 10 via some network. The term 'CPE' is inclusive of devices used to initiate a communication such as a receiver, a computer, a set-top box, a smart television, an Internet radio device (IRD), a cell phone, a telephone, a router, a switch, a residential gateway (RG), a fixed mobile convergence product, a home networking adaptor, an internet access gateway, a smartphone (e.g., a Google Droid, an iPhone), a tablet (e.g., an iPad), a personal digital assistant (PDA), or any other device, component, element, or object capable of initiating voice, audio, video, media, or data exchanges within communication system 10. CPEs 15a-15d may also be inclusive of a suitable interface to the human user, such as a display, a keyboard, a touchpad, a remote control, or other terminal equipment. CPEs 15a-15d may also be any device that seeks to initiate a communication on behalf of another entity or element, such as a program, a database, or any other component, device, element, or object capable of initiating an exchange within communication system 10. In addition, CPEs 15a-15d may be any devices that a service provider may deploy within the service provider's own network premises. Data, as used herein in this document, refers to any type of numeric, voice, video, media, or script data, or any type of source or object code, or any other suitable information in any appropriate format that may be communicated from one point to another.

CMTS 16 and CMs 20a-20b are network elements that can facilitate the network communication activities discussed herein. As used herein in this Specification, the term 'network element' is meant to encompass routers, switches, cable boxes, gateways, bridges, loadbalancers, cable CMTS routers, DSLAMs, cellular access concentrators, WiMAX access concentrators, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms, communication protocols, and interfaces that allow for the effective exchange of data or information.

In one implementation, CMTS 16 and/or CMs 20a-20b include software to achieve (or to foster) the network communication activities discussed herein. This could include, for example, the implementation of instances of a resequencer module, where these modules interact, perform reciprocating functions, and/or suitably coordinate their activities with peers. Additionally, each of these elements can have an internal structure (e.g., a processor, a memory element, etc.) to facilitate some of the operations described herein. In other embodiments, these network communication activities may be executed externally to these elements, or included in some other network element to achieve the intended functionality. Alternatively, CMTS 16 and/or CMs 20a-20b may include software (or reciprocating software) that can coordinate with other network elements in order to achieve the network communication activities described herein. In still other embodiments, one or several devices may include any suitable algorithms, hardware, software, components, modules, interfaces, or objects that facilitate the operations discussed herein with respect to resequencing activities.

Figure 6:
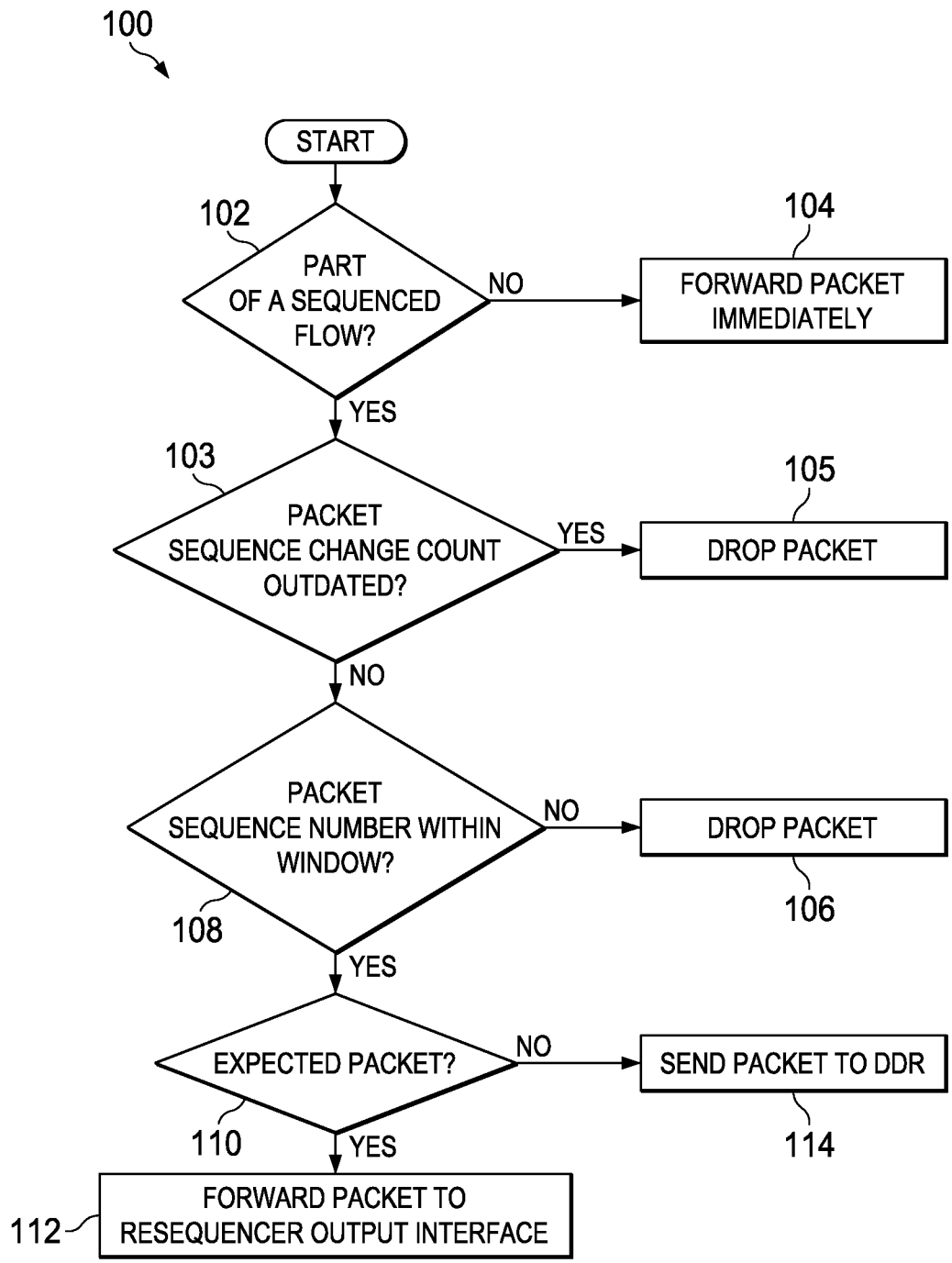
FIG. 6 is a simplified flowchart illustrating potential operations associated with the present disclosure.

FIG. 6 is a simplified flowchart 100 illustrating potential operations associated with the present disclosure. This generalized flow may begin at 102, where a determination is made whether a given packet is part of a sequenced flow. If it is not, then at 104, the packet is forwarded immediately. At 103, a determination is made as to whether a packet sequence change count is outdated. If it is, then the packet is dropped at 105. If it is not, then the process moves to 108, where a determination is made as to whether the packet sequence number is within a time window. If it is not, then the packet is dropped at 106. If it is, then at 110, a determination is made as to whether this particular packet is the next expected packet. If it is, then the packet is forwarded to the resequencer output interface at 112. If it is not, then the packet is sent to any suitable memory at 114 (e.g., the off-chip memory). Note that at 112, any suitable traffic shaping (e.g., for the flow through path) can be added.

Figure 7:
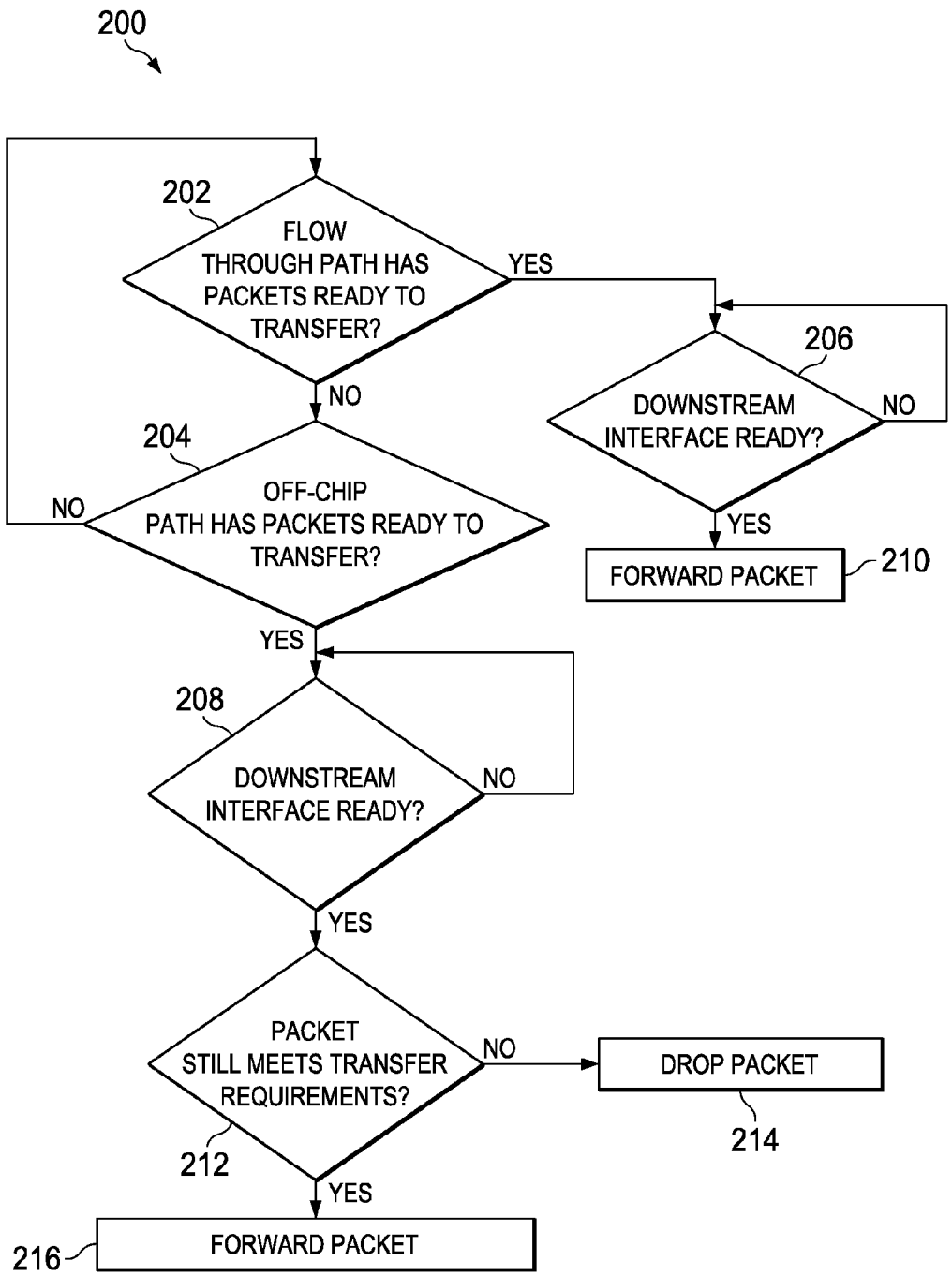
FIG. 7 is another simplified flowchart illustrating potential operations associated with the present disclosure.

FIG. 7 is a simplified flowchart 200 illustrating example activities associated with an output side state machine. The flow may begin at 202, as a determination is made as to whether a flow through path has packets ready (RDY) to transfer. If not, then the process moves to 204, where a determination is made as to whether the off-chip path has packets ready to transfer. If yes, then at 208 a determination is made as to whether a downstream interface is ready. If yes, then a subsequent determination is made as to whether a packet still meets the transfer requirements. If yes, then the packet is forwarded at 216. If not, the packet is dropped at 214. Returning to the flow process at 206, a determination can be made as to whether a downstream interface is ready. If it is, then the packet is forwarded at 210; however, if it is not, then the process cycles through the previous activity to re-answer the query at 206.

Note that in certain example implementations, the functions outlined herein to recover lost information for certain devices may be implemented in logic encoded in one or more non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory [as shown in FIGS. 3-4] can store data used for the operations described herein. This includes the memory being able to store instructions (e.g., software, logic, processor instructions, etc.) that can be executed to carry out the activities described in this Specification. A processor can execute any type of instructions associated with the data to achieve the operations detailed herein in this Specification. In one example, the processor [as shown in FIGS. 3-4] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Furthermore, any of the memory items discussed herein (e.g., memory element 68, buffers, databases, tables, trees, etc.) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding flow diagrams illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

It is also important to note that off-chip memory can refer to memory separate from the main processing logic and not to any specific IC package or IC packaging technology. Off-chip memory could be implemented as a memory in a separately packaged memory IC, as memory on a separate die inside a multichip module, or as memory on a separate die and stacked in a 3D chip.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols (e.g., involving various DOCSIS Specifications), communication system 10 may be applicable to other protocols and arrangements, and any version of the DOCSIS Specification. Additionally, communication system 10 may work with other access concentrator systems that use different Layer 2 subscriber identifiers. Moreover, the present disclosure is equally applicable to various technologies, aside from DSL and/or cable architectures, as these have only been offered for purposes of discussion.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    receiving a plurality of packets at an on-chip portion of a hardware resequencer in a cable modem network environment;
    identifying a particular packet, of the plurality of packets, as out-of-order in a particular sequenced flow;
    writing a packet data of the out-of-order packet to an on-chip packet data buffer;
    writing a packet control information of the out-of-order packet to an on-chip packet descriptor buffer at a descriptor number;
    assigning the out-of-order packet a block number corresponding to an address in an off-chip memory;
    writing the packet data from the on-chip packet data buffer to the off-chip memory; and
    writing the descriptor number and the block number to an on-chip linked list associated with the sequenced flow, the linked list tracking packets corresponding to a combination of flow and radio frequency channel.

2. The method of claim 1, wherein a packet inspection module is used to set one or more flags for identifying characteristics associated with the plurality of packets.

3. The method of claim 1, wherein certain packets in non-sequenced flows are routed directly from an input interface to an output interface of a resequencer module using a flow-through packet path.

4. The method of claim 3, wherein the flow-through packet path includes at least one buffer.

5. The method of claim 1, wherein if the plurality of packets are not part of a sequenced flow, the plurality of packets bypass a resequencing function and are forwarded to a next processing stage.

6. The method of claim 1, wherein a resequencing context is generated for each sequenced flow that is buffered using the combination of on-chip and off-chip memories.

7. The method of claim 1, wherein certain packets that are forwarded to a resequencing module are managed and stored until a time at which they can be forwarded to a next processing stage.

8. The method of claim 1, where in-order packets corresponding to a first group of flows is stored on-chip as part of a single integrated circuit, and wherein out-of-order packets corresponding to a second group of flows is stored off-chip and not part of the single integrated circuit.

9. The method of claim 1, wherein if a particular sequence number of the particular packet is not within a time window, the particular packet is dropped.

10. The method of claim 1, wherein if the particular packet was not expected, the particular packet is forwarded to the off-chip memory.

11. Logic encoded in one or more non-transitory media that includes instructions for execution and when executed by a processor is operable to perform operations, comprising:
    receiving a plurality of packets at an on-chip portion of a hardware resequencer in a cable modem network environment;
    identifying a particular packet, of the plurality of packets, as out-of-order in a particular sequenced flow;
    writing a packet data of the out-of-order packet to an on-chip packet data buffer;
    writing a packet control information of the out-of-order packet to an on-chip packet descriptor buffer at a descriptor number;
    assigning the out-of-order packet a block number corresponding to an address in an off-chip memory;
    writing the packet data from the on-chip packet data buffer to the off-chip memory; and
    writing the descriptor number and the block number to an on-chip linked list associated with the sequenced flow, the linked list tracking packets corresponding to a combination of flow and radio frequency channel.

12. The media of claim 11, wherein packet inspection is used to set one or more flags for identifying characteristics associated with the plurality of packets.

13. The media of claim 11, wherein certain packets in non-sequenced flows are routed directly from an input interface to an output interface of a resequencer module using a flow-through packet path.

14. The media of claim 13, wherein the flow-through packet path includes at least one buffer.

15. The media of claim 11, wherein if the plurality of packets are not part of a sequenced flow, the plurality of packets bypass a resequencing function and are forwarded to a next processing stage.

16. The media of claim 11, wherein a resequencing context is generated for each sequenced flow that is buffered using the combination of on-chip and off-chip memories.

17. The media of claim 11, wherein certain packets that are forwarded to a resequencing module are managed and stored until a time at which they can be forwarded to a next processing stage.

18. The media of claim 11, where in-order packets corresponding to a first group of flows is stored on-chip as part of a single integrated circuit, and wherein out-of-order packets corresponding to a second group of flows is stored off-chip and not part of the single integrated circuit.

19. A resequencer module in a cable modem network environment, comprising:
    an input interface;
    an output interface;
    a memory element configured to store instructions;
    a processor coupled to the memory; and
    a list manager configured to store packet information, wherein the resequencer module is configured for:
        receiving a plurality of packets at an on-chip portion of the resequencer module;
        identifying a particular packet, of the plurality of packets, as out-of-order in a particular sequenced flow;
        writing a packet data of the out-of-order packet to an on-chip packet data buffer;
        writing a packet control information of the out-of-order packet to an on-chip packet descriptor buffer at a descriptor number;
        assigning the out-of-order packet a block number corresponding to an address in an off-chip memory;
        writing the packet data from the on-chip packet data buffer to the off-chip memory; and
        writing the descriptor number and the block number to an on-chip linked list associated with the sequenced flow, the linked list tracking packets corresponding to a combination of flow and radio frequency channel.

20. The resequencer module of claim 19, where in-order packets corresponding to a first group of flows is stored on-chip as part of a single integrated circuit of the resequencer module, and wherein out-of-order packets corresponding to a second group of flows is stored off-chip and not part of the single integrated circuit.

* * * * *